United States Patent [19]

Pope

[11] Patent Number: 4,640,532

[45] Date of Patent: Feb. 3, 1987

[54] JOINING MEANS AND METHOD FOR JOINING METAL MEMBERS

[75] Inventor: Paul B. Pope, Auckland, New Zealand

[73] Assignee: McConnell Dowell Constructors Limited, New Zealand

[21] Appl. No.: 557,930

[22] Filed: Dec. 5, 1983

[30] Foreign Application Priority Data

Dec. 10, 1982 [NZ] New Zealand ............ 202768

[51] Int. Cl.4 .............................................. F16L 53/00
[52] U.S. Cl. ....................................... 285/41; 285/47; 285/55; 285/286
[58] Field of Search ................ 285/21, 22, 55, 41, 285/286, 47

[56] References Cited

U.S. PATENT DOCUMENTS

| | | | |
|---|---|---|---|
| 3,516,689 | 6/1970 | Binford et al. | 285/47 |
| 3,666,295 | 5/1972 | Carbonnel et al. | 285/41 |
| 3,843,170 | 10/1974 | Bagnulo | 285/55 |
| 4,336,958 | 6/1982 | Goetzinger | 285/55 |
| 4,348,041 | 9/1982 | Imai et al. | 285/41 X |
| 4,400,019 | 8/1983 | Frack | 285/55 |

FOREIGN PATENT DOCUMENTS

| | | | |
|---|---|---|---|
| 1210063 | 3/1960 | France | 285/55 |
| 1431797 | 2/1966 | France | 285/55 |
| 178662 | 1/1977 | New Zealand | |
| 155203 | 8/1932 | Switzerland | 285/286 |

*Primary Examiner*—Dave W. Arola
*Attorney, Agent, or Firm*—Stevens, Davis, Miller & Mosher

[57] ABSTRACT

The invention comprises a coupler used in pairs for joining the ends of two metal members such as pipes by welding. Each coupler has a slot with an external passage to act as a heat barrier to prevent the flow of heat from the welded connection between two couplers to a heat sensitive liner adjacent a surface opposite to that of the weld. The liner is locked into a rebate in the coupler and each coupler is positively aligned with the other.

4 Claims, 1 Drawing Figure

JOINING MEANS AND METHOD FOR JOINING METAL MEMBERS

BACKGROUND OF THE INVENTION

This invention relates to an improved joining means and method for joining metal members.

In this specification the term metal member is intended to relate to either a sheet, strip or pipe of metal.

It has become common for metal members such as pipelines conveying abrasive substances to be lined inside with a plastics material which is resistant to abrasion and anti-corrosion effects. Such pipelines are typically assembled by connecting individual pipes by bolting flanged ends of the pipes together. This method of construction is very expensive. A better method of construction is to weld the pipes together. However this is not normally attempted because the plastics material lining the pipes is sensitive to heat damage when welding occurs near it. This invention consists in a joining means intended to go some way towards overcoming this difficulty.

BRIEF SUMMARY OF THE INVENTION

In a first aspect the present invention consists in a coupler comprising a first surface and a second surface substantially opposite the first surface, a first end and a second end substantially opposite the first end, the first end of the coupler in use being connectable by welding to a metal member, the second end in use being connectable to the second end of another coupler at or near the first surface by welding, the coupler having an insulating means interposed between the first and second surfaces at the second end so as in use substantially to reduce any transfer of heat towards the second surface when welding the second end of the coupler to the second end of another coupler.

In a second aspect the present invention consists in a combination of a pair of couplers and two metal members where in use the second end of the couplers are welded together with one metal member being welded to the first end of one coupler, and the other metal member being welded to the first end of the other coupler.

In a third aspect the present invention broadly consists in a method of joining two metal members comprising the steps of welding each metal member a first end of a respective coupler as defined above, assembling a heat sensitive liner adjacent a surface of each metal member and the second surface of each coupler, the said surface of the metal members in use being a surface aligned with the second surfaces of the couplers, placing the second end of a coupler in register with the second end of the other coupler and aligning them, and welding the couplers together at the intersection of the first surfaces and the second ends.

BRIEF DESCRIPTION OF THE DRAWING

The above gives a broad description of the present invention, one preferred form of which will now be described with reference to the accompanying drawing labelled FIG. 1 which is a cross-section along the longitudinal axis of a pair of couplers joining two metal members.

DETAILED DESCRIPTION OF THE PREFERRED EMBODIMENT

Figure 1:
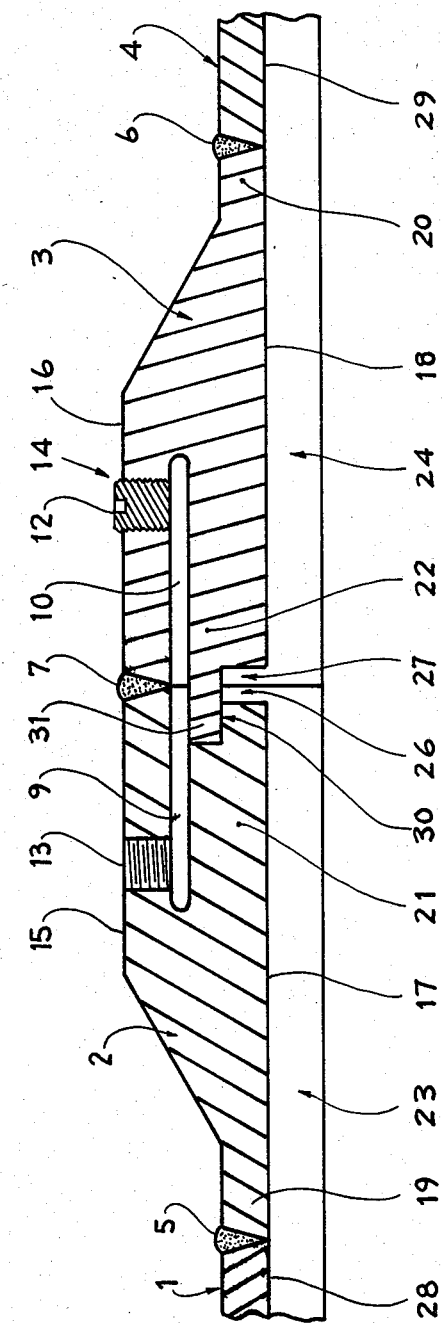

The preferred joining means comprises a coupler 2 or 3 to be connected to a metal member 1 or 4. Typically the metal member is a pipe. Each coupler consists in a first surface 15 or 16 and a second surface 17 or 18 substantially opposite the first surface 15 or 16. The coupler 2 or 3 also has a first end 19 or 20 and a second end 21 or 22 substantially opposite the first end 19 or 20 respectively. The wall of each coupler 2 or 3 is thicker towards the second end 21 or 22 than at the first end 19 or 20. An insulating means such as a slot 9 or 10, is spaced from the outside wall 15 or 16 of the couplers 2 or 3 an amount equal to or greater than the thickness of the first end 19 or 20 of the coupler 2 or 3. This is to ensure that the metal area above the insulating slot 9 or 10 has a weldable surface deep enough to maintain the strength of the coupler 2 or 3. The insulating slot 9 or 10 is typically a continuous fluid filled slot. However it could be a lamination of an insulating material. The insulating slot is interposed between the outside wall 15 or 16 and the inside wall 17 or 18 at the second end 21 or 22 of the coupler 2 or 3. The insulating slot is preferably substantially parallel with the inside wall 17 or 18.

The slots 9 and 10 are preferably aligned and each slot preferably communicates with a passageway 13 or 14 to the outside surface 15 or 16 of the couplers 2 or 3. The passageway 13 or 14 permits a liquid to be pumped through the slot 9 or 10 to reduce the build up of any heat at this point during welding. Otherwise air cooling is used with or without access to passageways.

The coupler 2 or 3 preferably has a rebate 26 or 27 at the intersection of the second end 21 or 22 and the second surface 17 or 18 of the coupler 2 or 3. The rebate 26 or 27 enables the flanged ends of the liners 23 or 24 assembled next to the second surface 17 or 18 of the couplers to be butted into the rebate and held firm when the couplers 2 or 3 are assembled in use.

One of a complementary pair of couplers 2 may have a groove 30. The other coupler 3 may have a tongue 31 which is located in the groove of the other coupler 2 to form a tongue and groove joint. This joint permits one coupler 2 to be aligned with the other coupler 3 and so ensures the insulating means 9 or 10 in the couplers 2,3 are aligned to form a continuous heat barrier where the couplers are cylindrical which is the case if pipes are to be joined.

A heat sensitive liner 23,24 is assembled next to the second surface 17,18 of the couplers 2,3 and also to the aligned surface of the metal members 1,4 being joined.

Where the metal members are pipes and the couplers are cylindrical the slot 9 or 10 forms a continuous circular band within each coupler 2 or 3 and so inhibits the transfer of heat to the inside wall 17 or 18 of the coupler 2 or 3 when the pipes are welded together at 7.

The method of joining two pipes 1,4 using a pair of couplers 2,3 consists in the following steps:

Firstly, the end of each pipe 1,4 is welded to a first end 19,20 of a respective coupler 2,3 to form welds 5,6. Next a heat sensitive liner 23,24 is assembled next to the second surface 28,29 of each pipe 1,4. Similarly, the heat sensitive liner 23,24 is assembled next to the second surface 17,18 of each coupler 2,3. The heat sensitive liner 23,24 is butted into the rebates 26,27 and the second ends 21,22 of the couplers 2,3 and the couplers 2,3 are placed in register with each other. The couplers 2,3 are aligned by the tongue 31 and the groove 30 and are then welded at the intersection of the outside wall 15,16 and the second end 21,22 to form weld 7.

The slots 9,10 in the couplers 2,3 reduce the transfer of heat to the liners 23,24 during welding. The heat produced by the welding of the couplers 2,3 together is monitored by a temperature sensing means. In order to keep the heat produced from welding to an acceptable level a fluid such as water is preferably passed into one of the passageways 13 and through the slots 9,10 and out the other passageway 14 while the welding is being done. When the temperature of the couplers 2,3 reaches a pre-determined level, welding is terminated until the couplers 2,3 cool to a pre-determined level whereupon the welding can be recommenced.

After all welding has been undertaken, the above mentioned slots 9,10 are filled with a liquid substance which subsequently solidifies. The liquid substance is injected into the slots 9,10 and typically will be an epoxy compound. Once the slots 9,10 have been filled, the passageways 13,14 leading to the outside surface 15,16 are sealed by plugs such as plug 12. This prevents the ingress of water and the like.

What I claim is:

1. A coupler, comprising:

a body having an outside wall and an inside wall substantially opposite the outside wall, a first end and a second end substantially opposite the first end, the first end of the coupler in use being connectable by welding to a metal member, the second end in use being connectable by welding to the second end of another coupler at the outside wall of both couplers, the couplers having a slot open at the second end and interposed between the outside and inside walls at the second end so as in use substantially to reduce any transfer of heat towards the inside wall when welding the second end of the coupler to the second end of another similar coupler, the slot being displaced from the outside wall an amount at least equal to the thickness of the first end;

a passageway from the outside wall into said slot;

a rebate at the corner of the intersection of the second end and the inside wall; and alignment means to align butted couplers so that their outside and inside walls are substantially aligned.

2. A coupler as claimed in claim 1, in which the inside wall is substantially cylindrical and the alignment means includes a rebate provided at that corner of the slot and the second end which is closer to the inside wall.

3. A pipeline, comprising two lengths of pipe and two couplers as claimed in claim 1, the couplers having inside walls which are substantially cylindrical and are of substantially the same internal diameter as the pipes, the first end of each coupler being welded to an end of a respective said length of pipe, the insulating slot in one coupler being aligned with the insulating slot of the other coupler to form a continuous heat barrier, the second ends of the couplers being welded together at the outside walls and a plastics internal lining to the pipeline which extends into the rebates at the corners of the couplers at the junction of their second ends and inside walls.

4. A coupler for welding to and joining a pair of pipes, each of uniform diameter along their respective lengths, each pipe having a lining of heat sensitive insulating material along a major portion of its length, said coupler comrising:

a pair of mateable coupler halves, each being adapted for welding to one end of the pipes to be joined, and each having:

(a) a hollow generally cylindrical body having first and second circular ends and an inner and an outer wall;

(b) said first circular end having its inner and outer walls of a diameter generally equal to that of the end of the pipe end to which it is to be welded so that it may be butt-welded thereto by a first weld when a portion of the liner of the pipe is not in place to leave a clear inner passage of substantially uniform diameter along its length, into which a section of said liner may be placed so that the liner is then substantially continuous along the pipe length;

(c) said second circular end having its inner diameter generally equal to the inner diameter of the first end and an outer diameter considerably larger than the outer diameter of the first end and thus defining a greater coupler wall thickness at the second end than at the first end;

(d) an annular slot extending axially inwardly from the second circular end within said greater wall thickness, said annular slot being positioned so that the wall thickness radially outward thereof is at least as great as the wall thickness of said pipe end adapted to be welded by a second weld to a mating second end of a similar coupler half so that the strength of the welded wall thickness radially outward of the annular slot is as great as the strength of the welded wall thickness of the first end;

(e) both said coupler halves receiving a section of liner therein after said first weld is made and before said second weld is made, said liner sections extending axially beyond said first welds so that the liner is then substantially continuous through the two coupler halves;

(f) said annular slots having passageways opening through said radially outer wall thickness so that a fluid may flow through said slots to substantially reduce any transfer of heat toward a liner within said coupler when said second weld is made; and (g) alignment means associated with the mating surfaces of said second ends so that their outer walls will be aligned when the two coupler halves are assembled and welded.

* * * * *